Figure 1:
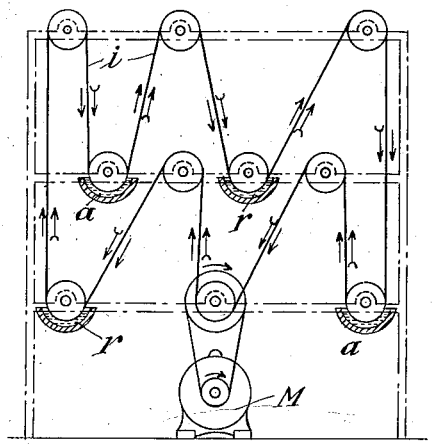

Oct. 15, 1929.  E. PFIFFNER  1,731,261
METHOD OF METALLIZING THE SURFACES OF INSULATING BANDS
PARTICULARLY FOR USE IN ELECTRIC CONDENSERS
Filed Dec. 16, 1925

E. Pfiffner
INVENTOR
By: Marks & Clerk
ATTYS

Patented Oct. 15, 1929

1,731,261

UNITED STATES PATENT OFFICE

EMIL PFIFFNER, OF FRIBOURG, SWITZERLAND, ASSIGNOR, BY MESNE ASSIGNMENTS, TO RADIO PATENTS CORPORATION, OF NEW YORK, N. Y., A CORPORATION OF NEW YORK

METHOD OF METALLIZING THE SURFACES OF INSULATING BANDS PARTICULARLY FOR USE IN ELECTRIC CONDENSERS

Application filed December 16, 1925, Serial No. 75,859, and in Germany November 24, 1924.

Applications for patent have been filed in Germany, Nov. 24, 1924; Austria, Nov. 4, 1925; Switzerland, Nov. 21, 1925; Hungary, Nov. 23, 1925; Belgium, Nov. 23, 1925; Sweden, Nov. 23, 1925; France, Nov. 23, 1925; Italy, Nov. 23, 1925; Norway, Nov. 23, 1925; Great Britain, Nov. 24, 1925.

This invention relates to a method of and means for metallizing the surfaces of insulating bands particularly for use in electric condensers.

Insulating plates, which are coated at one side or both sides with an electrically conducting layer, are frequently used in electrical devices, particularly in the manufacture of electric condensers. In case this conducting layer consists of a metal coating, the same is preferably formed by precipitating the metal from a metallic salt solution by means of a reducing or precipitating agent.

Generally the process used in the art consists in that the reducing agent is added to the metallic salt solution, whereby the precipitation is effected.

However the baths are utilized far more economically if the reducing agent is not added directly to the metallic salt solution, but if the surface to be metallized is coated or wetted alternately with the one fluid and the other fluid.

If large surfaces are to be treated, the coating with the fluids is carried out preferably mechanically, whereby also a greater uniformity is obtained.

The alternate coating or wetting of the surface of the plate or sheet to be metallized may be carried out in different manners by known means, for instance by passing the plates or bands between rollers or the like wetted with the fluids.

According to the present invention the method for metallizing the surfaces of insulating bands, strips or webs by the chemical precipitation of the metal contained in a metallic salt solution essentially consists in passing the endless band, strip or web to be metallized, alternately through a bath containing the metallic salt solution and through a bath containing a reducing or precipitating agent, which process may be repeated as required.

The metallic salt solution may be an alkaline silver bath consisting of a solution of silver nitrate from which the silver is precipitated with strong caustic alkali, the precipitate being redissolved in just sufficient strong ammonia solution, and as reducing or precipitating agent the solution of an aldehyde may be used, other kinds of solutions or precipitating agents may be selected from those known in the art.

Two modifications of carrying out the present invention are illustrated diagrammatically on the accompanying sheet of drawings.

Fig. 1 shows a device for automatically and alternately wetting or coating insulating bands or strips with the metallic salt solution and the reducing agent. The wetting or coating is effected in that the insulating band, in the form of an endless band, is passed over suitable drums which are rotated by a motor, and alternately is fed through a bath of the one fluid and through another bath of the other fluid.

A plurality of such baths may be combined in staggered relation as indicated in the drawing.

In the construction shown in Fig. 1, $i$ designates the insulating band, strip or web, $a$ the metallic salt baths, $r$ the reducing baths and M the motor.

According to the invention, two of each kind of the baths are arranged in such a manner that each side of the band, which has to be wetted or coated at both sides, while passing through the baths is directed once outwardly, once inwardly as the wetting or coating of the side which at the time is in contact with the feed-drum, is not carried out satisfactory.

Figure 2:
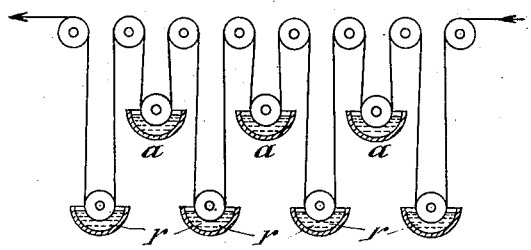

Or according to Fig. 2 the arrangement may be such that, for obtaining a continuous operation, the band passes through the machine once only (e. g. it passes into the machine in a non-metallized condition and out of the same in a metallized condition) in such a manner, that the band is fed alternately through the corresponding number of both baths.

However the subject-matter of the present invention has been illustrated by way of example only. The alternate wetting can be performed mechanically in any other convenient manner, for instance by dipping the band alternately into the baths and so forth.

I claim:—

1. The process of forming an electrically conductive coating along both surfaces of a flexible insulating sheet by reaction between a metallic salt solution and a reducing solution, which includes passing the sheet successively through said solutions while exposing one surface thereof freely to the solutions, thereby to form a conductive coating upon one side of the sheet, and then again passing the sheet successively through said solutions while exposing the other surface thereof freely to said solutions, thereby to form such a conductive coating along the latter mentioned surface of said sheet.

2. The process of forming an electrically conductive coating along both surfaces of a flexible insulating sheet by reaction between a metallic salt solution and a reducing solution, which includes passing the sheet successively through said solutions while exposing the then under surface thereof freely to the solutions, thereby to form a conductive coating upon one side of the sheet, turning the sheet upside down and then again passing the sheet successively through such solutions while exposing the then lower surface thereof to such solutions, thereby to form such a conductive coating along the latter mentioned surface of such sheet.

In testimony whereof I have signed my name to this specification.

EMIL PFIFFNER.